(12) United States Patent
Conlon et al.

(10) Patent No.: US 8,843,620 B2
(45) Date of Patent: Sep. 23, 2014

(54) MONITORING CONNECTIONS

(75) Inventors: Declan Sean Conlon, Sydney (AU);
Euan David Harris, Cambridge (GB)

(73) Assignee: Riverbed Technology, Inc., San Francisco, CA (US)

( * ) Notice: Subject to any disclaimer, the term of this patent is extended or adjusted under 35 U.S.C. 154(b) by 426 days.

(21) Appl. No.: 13/218,504

(22) Filed: Aug. 26, 2011

(65) Prior Publication Data

US 2012/0144026 A1 Jun. 7, 2012

(30) Foreign Application Priority Data

Aug. 27, 2010 (GB) .................................. 1014367.5

(51) Int. Cl.
*G06F 15/173* (2006.01)
*H04L 29/06* (2006.01)
*H04L 12/24* (2006.01)
*H04L 12/26* (2006.01)
*H04L 29/08* (2006.01)

(52) U.S. Cl.
CPC ........ *H04L 63/1458* (2013.01); *H04L 41/5009* (2013.01); *H04L 41/069* (2013.01); *H04L 43/0823* (2013.01); *H04L 43/04* (2013.01); *H04L 63/1416* (2013.01); *H04L 63/30* (2013.01); *H04L 67/2819* (2013.01); *H04L 67/2842* (2013.01); *H04L 67/1002* (2013.01)
USPC .......................................... 709/224; 709/203

(58) Field of Classification Search
USPC ................................................. 709/224, 203
See application file for complete search history.

(56) References Cited

U.S. PATENT DOCUMENTS

| 6,505,248 | B1 * | 1/2003 | Casper et al. ................. 709/224 |
| 7,383,332 | B2 * | 6/2008 | Chong et al. .................. 709/224 |
| 2002/0042823 | A1 | 4/2002 | DeBettencourt et al. |
| 2002/0062359 | A1 * | 5/2002 | Klopp et al. .................. 709/219 |
| 2002/0138618 | A1 * | 9/2002 | Szabo ........................... 709/225 |
| 2003/0069952 | A1 | 4/2003 | Tams et al. |
| 2005/0015773 | A1 * | 1/2005 | Gorman et al. ............... 719/310 |
| 2006/0288171 | A1 | 12/2006 | Tsien |
| 2007/0294387 | A1 * | 12/2007 | Martin .......................... 709/224 |
| 2009/0019137 | A1 * | 1/2009 | Mishra et al. ................. 709/220 |
| 2013/0054528 | A1 * | 2/2013 | Saika ............................ 707/638 |

FOREIGN PATENT DOCUMENTS

EP 2 161 896 A1 3/2010
WO 2005/050468 A1 6/2005

* cited by examiner

*Primary Examiner* — David Lazaro
(74) *Attorney, Agent, or Firm* — Park, Vaughan, Fleming & Dowler LLP

(57) ABSTRACT

Apparatus for processing requests from a plurality of connected clients for data stored by a plurality of connected servers comprising a processor, memory, storage, a network interface, and a user input device is disclosed. The processor is configured to receive requests from the connected clients via the network interface, select a connected server to route each requests to, thereby defining a selected server per request, create a connection per request to its selected server using the network interface, route the requests to their selected servers using the connections, and monitor the connections while the selected servers service the requests, so as to create monitored connection data for each connection. The monitored connection data is stored in data structures that are referenced by a buffer, and upon creation of a data structure relating to the most recently created connection, reference to the oldest data structure in the buffer is removed.

20 Claims, 14 Drawing Sheets

MONITORING CONNECTIONS

CROSS REFERENCE TO RELATED APPLICATIONS

This application claims priority from United Kingdom patent application number 10 14 367.5 filed Aug. 27, 2010, the entire disclosure of which is incorporated herein by reference.

BACKGROUND OF THE INVENTION

1. Field of the Invention

The present invention relates to routing requests from a plurality of connected clients to a plurality of connected servers, and in particular the monitoring of connections.

2. Description of the Related Art

Many situations arise in which a very large number of clients, possibly browsing the Internet, require access to a particular data source, such as a highly popular website. In order to serve data to many clients of this type, it is known to make the data available from many backend servers acting as a collection, with traffic management systems being used to even out loading in an attempt to optimise the available functionality.

Given the large number of requests received by a popular data source, it is possible that a proportion of the received requests will contain malicious code, or are requesting data that does not exist. This may cause the backend servers to fail, or spend time processing meaningless requests. A problem is encountered when an engineer wishes to inspect the requests that have caused errors or slow-downs. The high incoming request rate means that by the time the error has been noticed, the offending requests will have been serviced and detailed records of them removed.

BRIEF SUMMARY OF THE INVENTION

According to an aspect of the present invention, there is provided an apparatus for processing requests from a plurality of connected clients for data stored by a plurality of connected servers according to claim 1.

According to a further aspect of the present invention, there is provided a method of processing requests from a plurality of connected clients for data stored by a plurality of connected servers according to claim 11.

According to a further aspect of the present invention, there is provided A non-transitory computer-readable medium encoded with program instructions executable by a computer that, when executed by a computer, cause said computer to process requests from a plurality of connected clients for data stored by a plurality of connected servers according to claim 16.

DETAILED DESCRIPTION OF EXAMPLE EMBODIMENTS

FIG. 1

Figure 1:
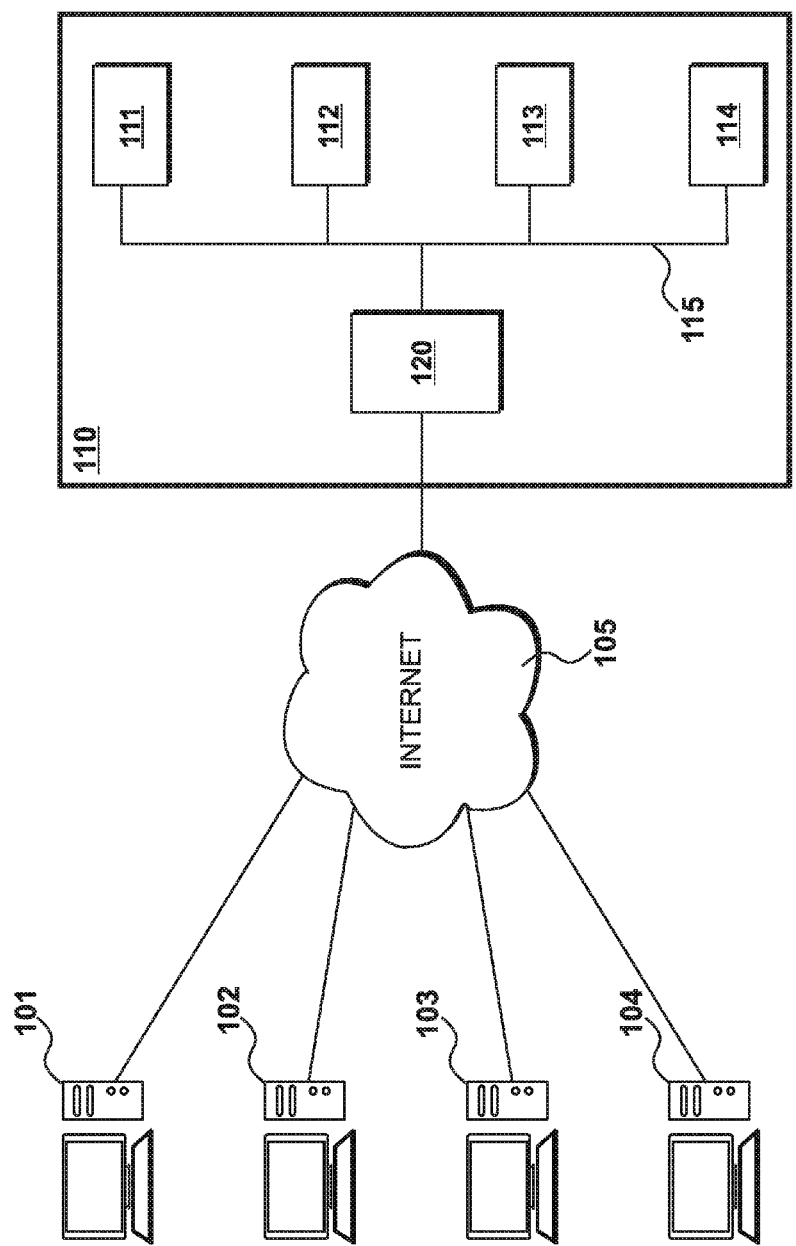
FIG. 1 illustrates an environment in which the invention may be implemented.

FIG. 1 illustrates an environment in which the invention may be implemented. A number of clients 101, 102, 103 and 104 are connected to Internet 105. Each of clients 101 to 104 is a device capable of connecting across a network to a service provider 110. For example, they may be desktop computers, laptops, mobile computing devices, or any other suitable computing device. In this example they connect across Internet 105, but they could be connecting to a local area network, a wide area network or some other type of network.

Service provider 110 comprises a number of servers 111, 112, 113 and 114. These all have access to the same data and respond to client requests in the same way, such that a request for data from any one of clients 101 to 104 can be routed to any one of servers 111 to 114 and be treated in exactly the same way. Servers 111 to 114 may be physically separate or may reside on one or more physical machines, and are connected by a local network 115.

In other embodiments the servers may be connected over any type of network, and would in fact be remote from each other. However, for performance reasons, it is preferable for the traffic manager and managed servers to be on a local network.

The routing of client requests to the servers is performed by a traffic manager 120. This receives requests over the Internet 105 from a client computer and uses load balancing algorithms to determine which server to send the request to.

Once the load balancing algorithm has selected a server, traffic manager 120 will connect to the selected server, say server 111, and route the request. In the event that the client request contained malicious data, server 111 may hang, fail or return an error code. Although traffic manager 120 may bring such an event to the attention of an engineer, in current systems the high incoming request rate means that by the time the engineer is able to inspect the system, details of the malicious request may no longer be available. Server logs may comprise details of the request's originating IP address, but any opportunity to observe how the server responded to the request and the reason for failure will no longer be available.

FIG. 2

Figure 2:
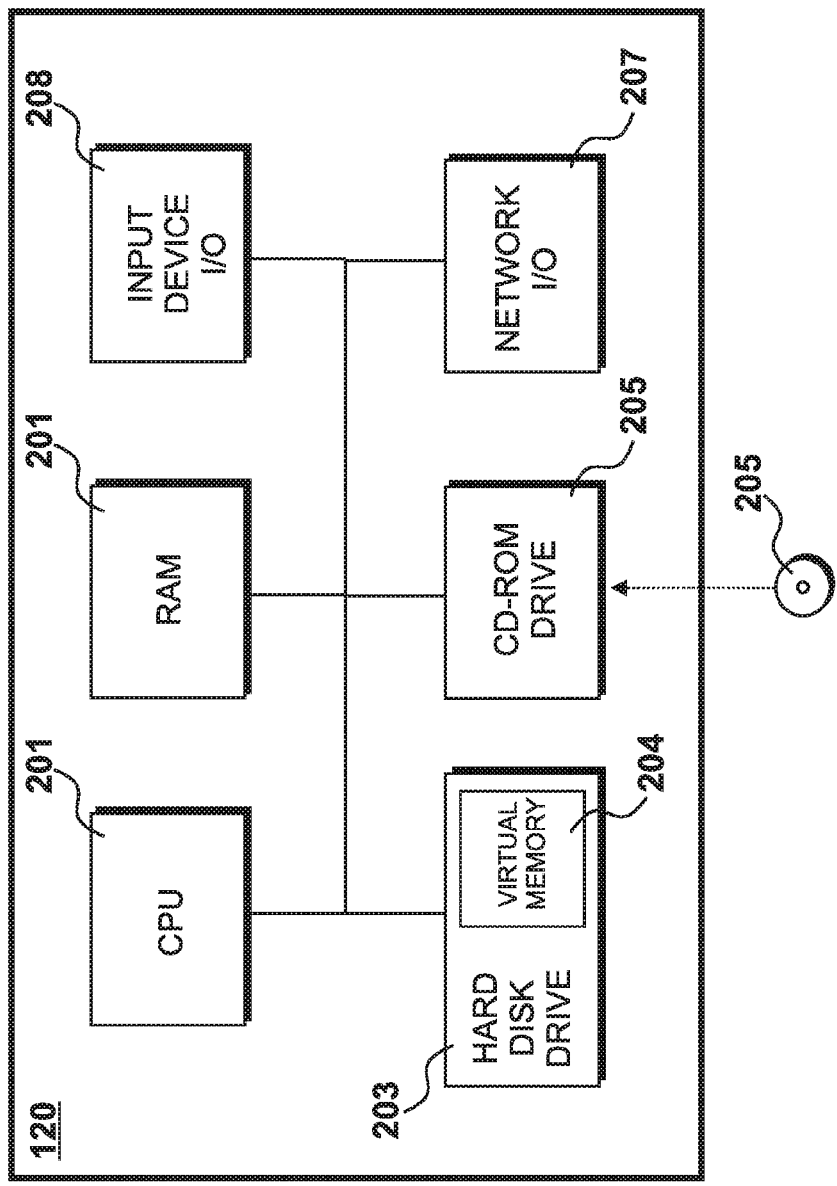
FIG. 2 shows traffic manager 120.

FIG. 2 shows traffic manager 120. It comprises a processor provided in this example by CPU 201, such as an Intel® Xeon® processor, 8 gigabytes of RAM 202, and storage provided by a 1 terabyte hard disk drive 203. A portion of storage on hard disk drive 203 is designated as virtual memory 204.

Instructions may be loaded from a CD-ROM 205 by a CD-ROM drive 206, or alternatively they may be downloaded from a network via a network interface 207.

Network interface 207 also provides connectivity to the Internet 105 and to local network 115, in order that traffic manager 120 may route requests between clients and the servers.

User input operations are facilitated by an input device interface 208, which allows the connection of human interface devices such as display 209, keyboard 210 and mouse 211.

FIG. 3

Figure 3:
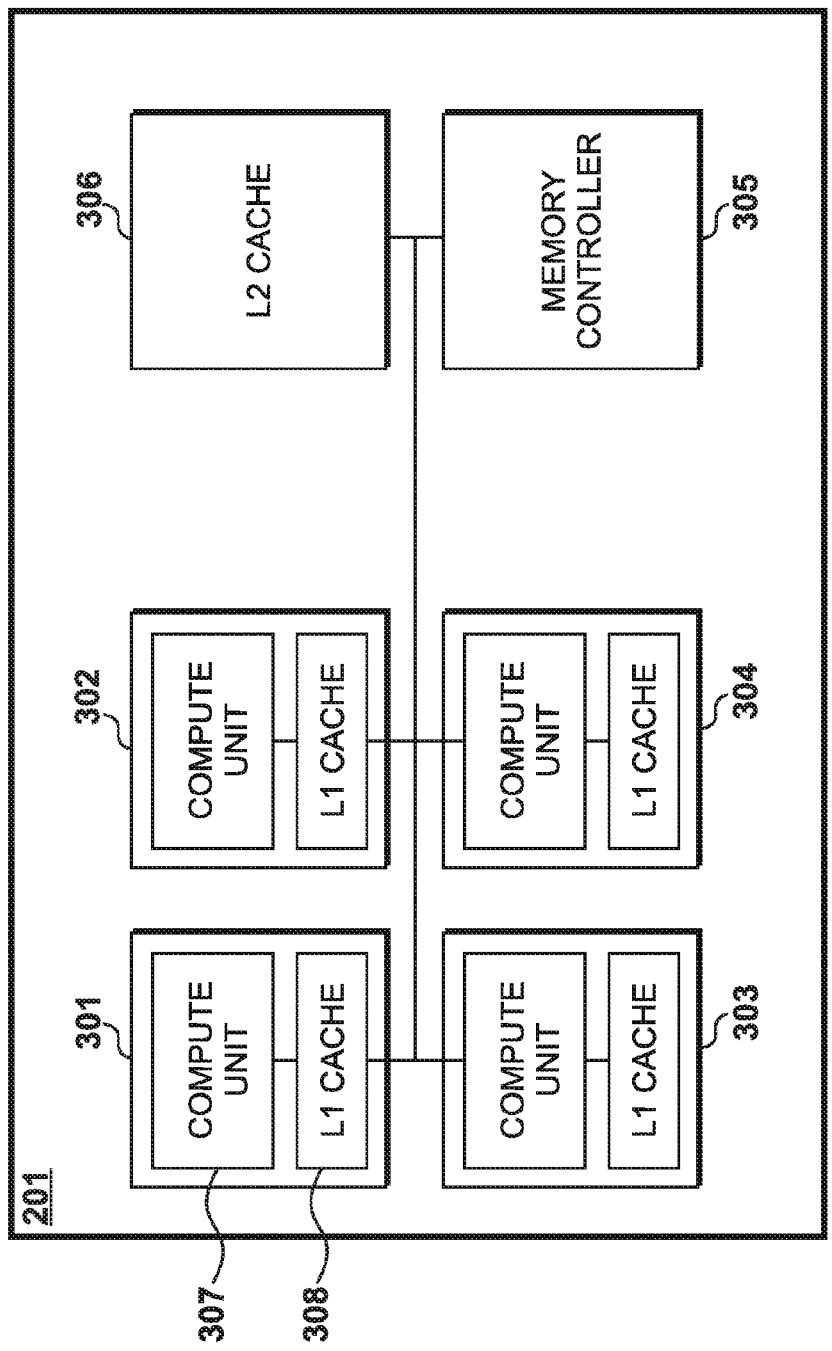
FIG. 3 details CPU 201.

FIG. 3 details CPU 201. It contains four cores 301, 302, 303 and 304, along with a memory controller 305 and a level two cache 306.

Core 301 includes a compute unit 307 and a level one cache 308. The other cores are identical. Providing four cores in a single CPU allows up to four sets of instructions to be processed simultaneously by CPU 201, thus increasing the speed and efficiency of traffic manager 120. In other embodiments, the CPU could have a different number of cores, or the processor could be provided by more than one CPU. Also, more than one compute unit could be presented to an operating system on each core through the use of simultaneous multi-threading or similar.

The level one caches of the cores and the level two cache 306 combine with RAM 202 and virtual memory 204 to provide memory for traffic manager 120. The exact location of instructions and data within the memory will vary between embodiments, implementations and particular requirements at any specific time.

FIG. 4

Figure 4:
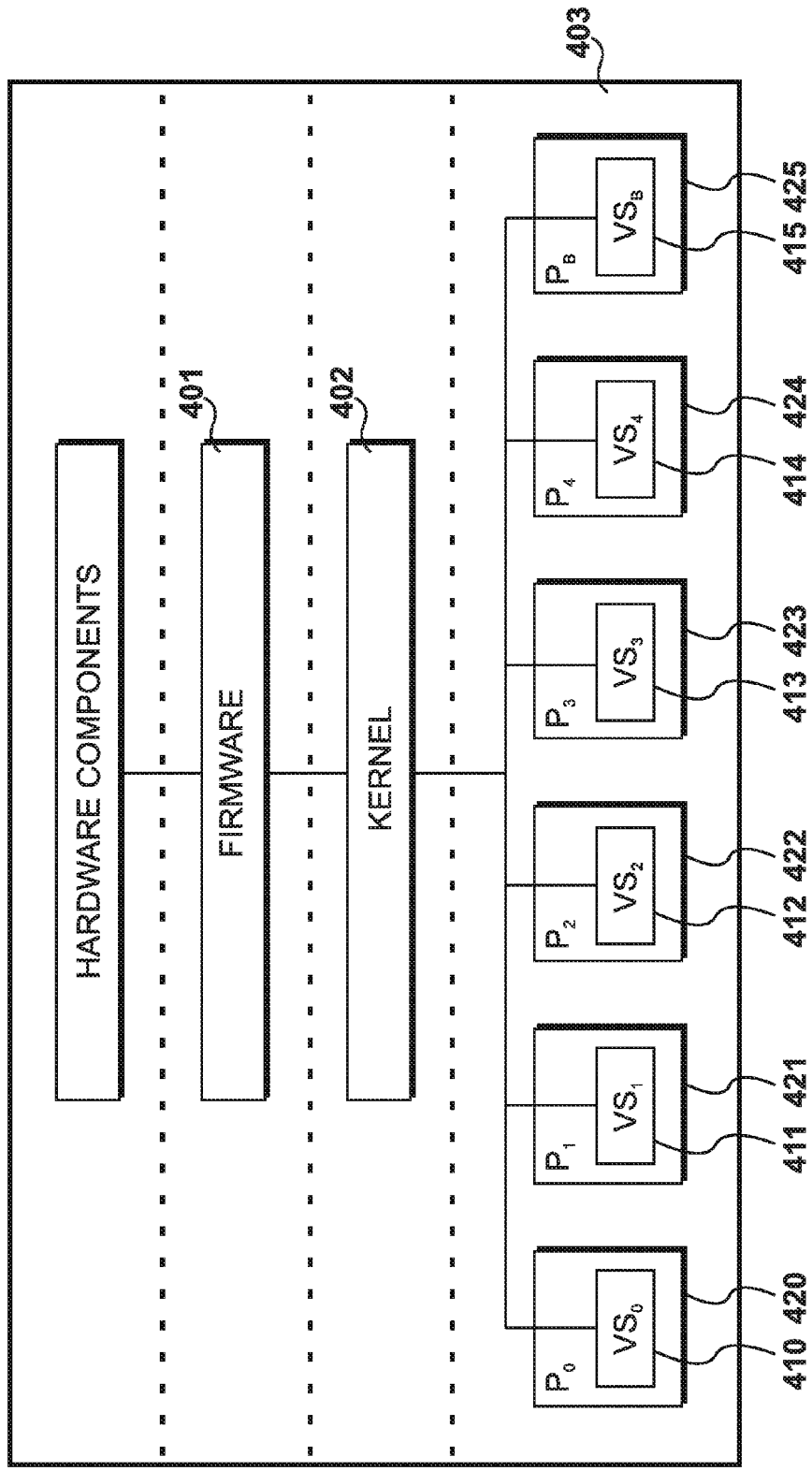
FIG. 4 shows an abstraction layer diagram of traffic manager 120.

An abstraction layer diagram of traffic manager 120 is shown in FIG. 4. On the first level are the hardware components detailed in FIGS. 2 and 3.

At the next level is firmware 401 that receives instructions from a kernel 402 and converts them into machine code executable by the components.

Kernel 402 manages allocation of memory to processes and the scheduling of process threads to CPU 201. Kernel 402 allocates portions of memory to various processes under its control. A portion is allocated as shared memory, which is readable and writable by all processes. Some portions are readable and writable only by the kernel 402 itself, and others are only readable and writable by individual processes. Additionally, kernel 402 manages the flow of output data provided by the firmware 401 to processes.

Process layer 403 comprises in this example five processes. Process 410 is a parent process that spawns child processes 411, 412, 413 and 414. In this example, four processes 411 to 414 are spawned because there are four compute units available. At any one time, each of the compute units may be running threads associated with one only of the processes 410 to 415.

Each of processes 410 to 414 includes a virtual server 420 to 424 for performing processing on requests.

Kernel 402 dispatches requests received via network interface 207 to process 410, whose virtual server 420 using a round robin scheduling algorithm to in turn dispatch the requests to any of processes 411 to 412.

Virtual server 421 in process 411 receives requests from process 410, and performs request modification according to predefined rules. Upon completion of request modification, virtual server 421 runs a load balancing algorithm to select which of servers 111 to 114 to dispatch each request to. Requests are then routed by opening a connection to the selected server. The remaining processes 412 to 414 operate in a similar way.

The virtual servers 421 to 424 monitor the connections they make to the servers and produce monitored connection data.

The architecture of many current traffic management systems, particularly hardware-based solutions, relies on the use of physically separate electronics for performing processing and routing of requests. Whilst monitored connection data may be produced during the lifetime of the connection, it is a computationally intensive and time-consuming process to copy it to external memory systems or physical storage devices. Thus, in many systems, only a small portion of this data (such as the client IP address and the timestamp of the request) is retained and stored in server logs, as these small portions of data do not require high levels of resources to copy. The remaining data is therefore deleted, and thus is unavailable for inspection at a later time.

As traffic manager 120 implements the traffic management instructions using virtual servers running in separate processes, all of the processing occurs on the same physical apparatus. Additionally, all of the data, instructions and code used by the virtual servers responsible for processing and routing requests (who produce the monitored connection data) resides within the same memory as the rest of the operating system's kernel and additional processes in traffic manager 120.

Thus, any operations involving the copying or moving of monitored connection data do not require that the data itself is copied or moved between physical devices. Instead, any copying can be achieved by creating references to the monitored connection data's place in memory, and any moving can be achieved by marking the monitored connection data as belonging to different processes. This is therefore a much less computationally intensive task than in other systems, and allows the monitored connection data to be retained and used for analysis.

The monitored connection data produced by virtual servers 421 to 424 is buffered by an additional virtual server 425 running in buffer process 415.

FIG. 5

Figure 5:
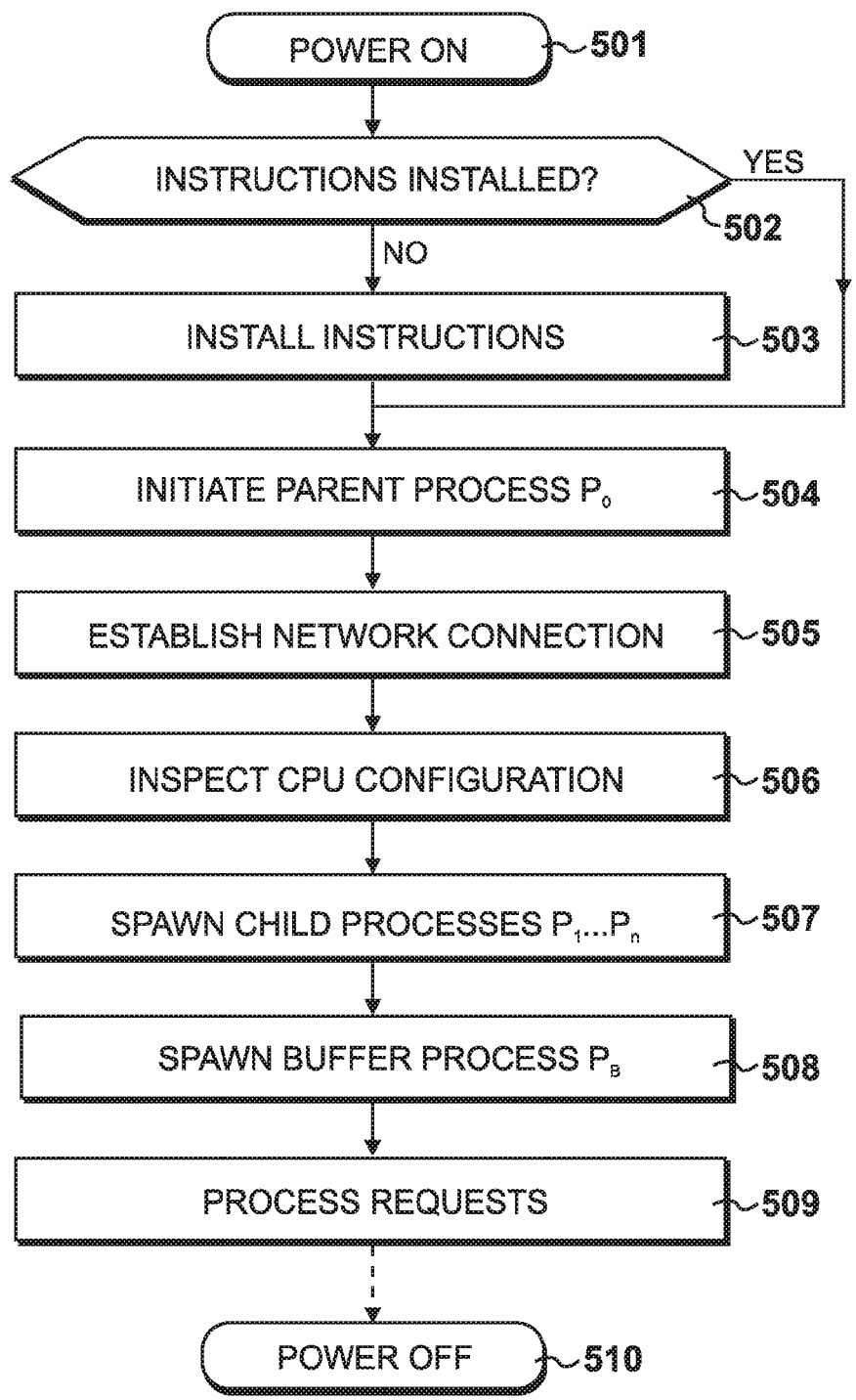
FIG. 5 details steps carried out by traffic manager 120 to route requests from clients 101 to 104 to servers 111 to 114.

FIG. 5 details steps carried out by traffic manager 120 to route requests from clients 101 to 104 to servers 111 to 114. At step 501 traffic manager 120 is powered on and at step 502 a question is asked as to whether the traffic management instructions are installed. If this question is answered in the negative then at step 503 the instructions are installed, either from a computer-readable medium such as CD-ROM 205 or from a network such as the Internet 105.

At step 503 the parent process 410 is initiated. Process 410 then carries out steps of establishing a network connection to network 115 at step 505 and inspecting the configuration of CPU 201 at step 506. Process 410 then spawns the necessary number of child processes, which in this example is four, at step 507. The number of processes is dependent on the number of compute units present in the CPU or CPUs on the traffic manager, so that if necessary each of the child processes could be run concurrently by CPU 201.

At step 508, buffer process 415 is spawned that manages the buffering of monitored connection data.

At step 509 client requests are received and routed to the servers. The traffic manager then continues to route requests indefinitely until powered off for any reason at 510. Parent process 410 is responsible for monitoring processes 411 to 415, and if one of them crashes it spawns a new process to replace it.

FIG. 6

Figure 6:
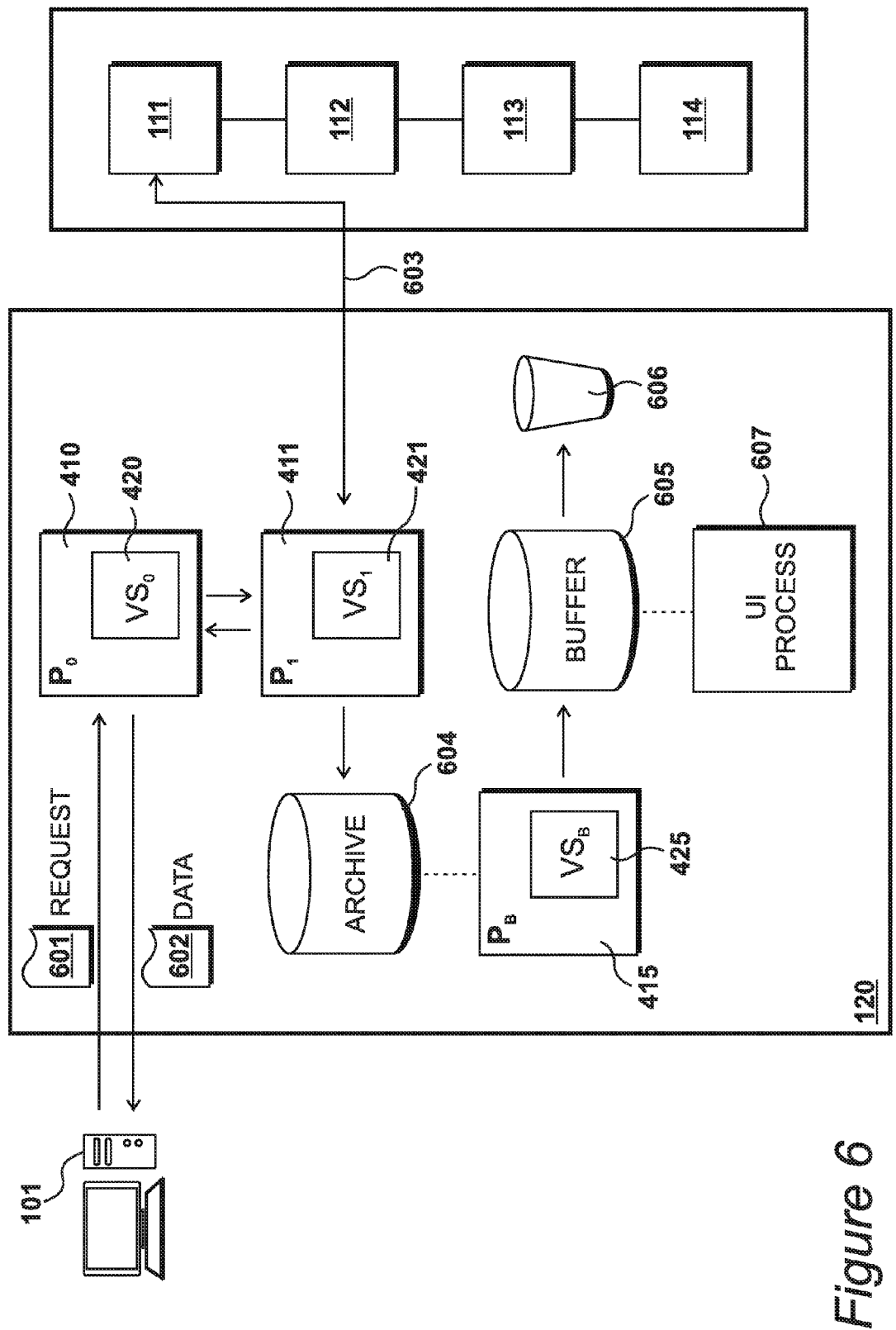
FIG. 6 illustrates the flow of requests and data between client 101, traffic manager 120 and servers 111 to 114.

FIG. 6 illustrates the flow of requests and data between client 101, traffic manager 120 and servers 111 to 114.

Client 101 sends a request 601 to service provider 110 for some data stored by each of servers 111 to 114. The request is received by traffic manager 120 via its network interface 207, and is dispatched by kernel 402 to parent process 410. Virtual server 420 within parent process 410 makes a decision as to which child process 411 to 414 to send the request to for further processing. In this example, the chosen child process is child process 411 comprising virtual server 421.

Virtual server 421 processes request 601, and runs a load balancing algorithm to assess which of servers 111 to 114 is best suited to service request 601. In this example, the running of the algorithm results in server 111 being selected. Virtual server 421 proceeds to open a connection 603 to server 111, and routes request 601 using connection 603.

The server responds by sending the requested data 602 back to virtual server 421 over connection 603, where it is dispatched back to parent process 410 for sending to client 101 via network interface 207.

Whilst connections are active, virtual servers in child processes 411 to 414 monitor the progress of requests they route to servers. This results in monitored connection data being produced whilst the connection is alive, which is stored in data structures in an archive 604. The process of archiving will be described further with reference to FIGS. 7 and 8.

Buffer process 415 comprises virtual server 425, which is responsible for maintaining a buffer 605. Buffer 605 is a fixed width array that contains references to a finite number of the data structures in archive 604, although any other type of data structure that is suitable for storing references may be used. When new references are added to buffer 605, old references are removed and garbage collected by a garbage collection service 606.

An external user interface process 607 is permitted to access buffer 605, and provide an engineer with a view at any particular moment of the monitored connection data in archive 604 that is referenced by buffer 605. The process of facilitating this functionality will be described further with reference to FIGS. 11 to 13.

FIG. 7

Figure 7:
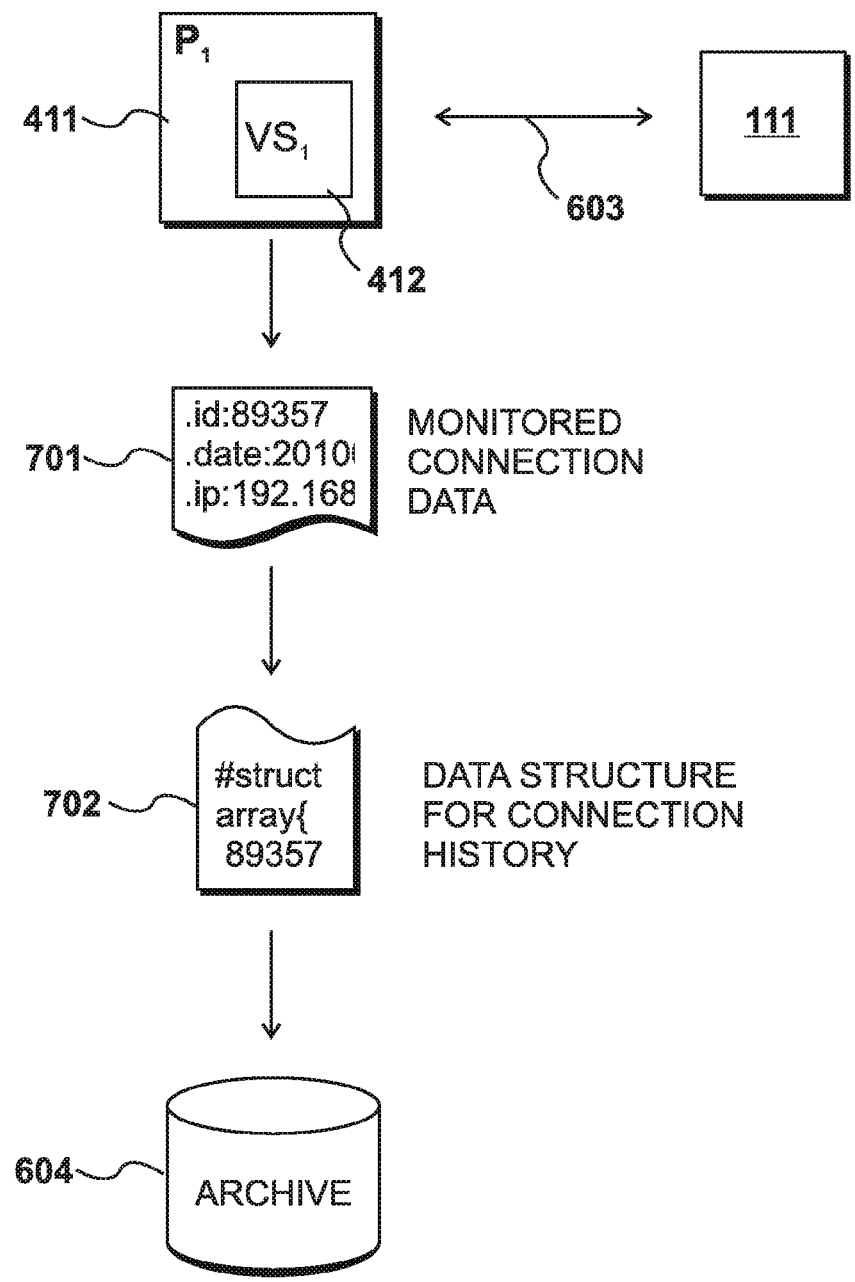
FIG. 7 illustrates the process of archiving monitored connection data.

FIG. 7 illustrates the process of archiving monitored connection data.

In order to allow a user to access monitored connection data for each request, virtual servers 421 to 424 archive the monitored connection data when a request has been serviced.

Upon opening connection 603 to server 111 and routing request 601, virtual server 421 in child process 411 begins to monitor the progress of the servicing of request 601. This results in monitored connection data being produced, which is written to a temporary file 701 in memory. In the present embodiment, temporary file 701 is a generic file to which a raw stream of data is written representing the monitored connection data. Alternatively, temporary file 701 may be a comma-separated value text file, which comprises elements of the monitored connection data delimited by commas.

Monitored connection data in temporary file 701 comprises data relating to the individual connection, such as a unique identifier for the particular connection, the IP address of the requesting client, the IP address of the server, the length of time the connection was alive for, the size of the request, the data that was returned, and so on.

Additionally, if server 111 encounters an error when it services request 601, monitored connection data in temporary file 701 will include data describing the cause of the error and how the server reacted. For example, if server 111 was servicing HTTP requests, then a request for a web page that does not exist on server 111 will result in a standard HTTP error code 504 being included within monitored connection data in temporary file 701.

In a further example, if a request was routed to server 111 that caused server 111 to crash, then monitored connection data in temporary file 701 would include data describing the error encountered by the server's operating system.

Upon the completion of servicing request 601, virtual server 420 completes writing monitored connection data to temporary file 701, and converts it into a data structure 702.

Data structure 702 structures the monitored connection data such that each element of data relating to the monitored connection has a key, whose value is the data. Depending on the implementation, suitable data structure types include records, arrays, associative arrays or sets. The conversion of temporary file 701 into data structure 702 allows the quick searching for data, as the structure of data structure 702 is predictable and ordered.

When the conversion of temporary file 701 into data structure 702 has been finished, its memory position is marked as belonging to archive 604, and thus data structure 702 has been archived. Thus, memory management services, such as a virtual memory manager in kernel 402 and the physical memory register in RAM 202, direct programs wishing to access data structure 702 to its location in the memory of traffic manager 120.

This is a much more computationally efficient operation than moving the data structure to a portion of memory marked as being an archive, as there is no movement of large volumes of data occurring within memory in traffic manager 120.

FIG. 8

Figure 8:
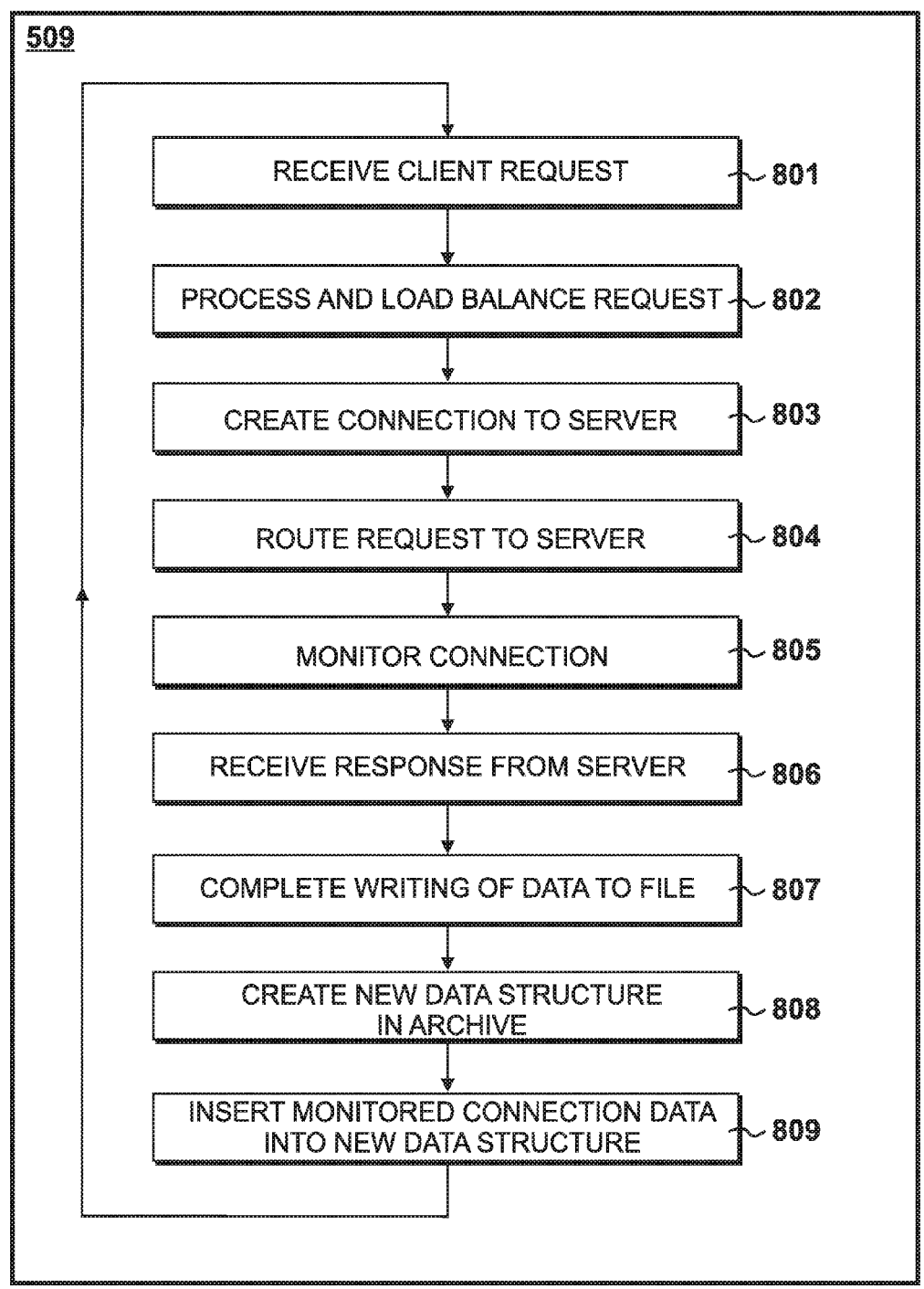
FIG. 8 shows steps carried out by virtual server 421 to archive monitored connection data during the processing of requests at step 509.

Steps carried out by virtual server 421 to archive monitored connection data during step 509 are shown in FIG. 8.

At step 801, virtual server 421 receives a client request that has been dispatched to it by parent process 420. At step 802, the request is processed and a load balancing decision is made to decide which server to route the request to. Upon completing the load balancing decision, virtual server 421 creates a connection to the chosen server at step 803, and at step 804 the monitoring of the connection begins, producing monitored connection data which is written to temporary file 701.

At step 805, the request is routed to the chosen sever. At step 806, the chosen server responds to virtual sever 421 by either sending the requested data, in which case the servicing of client request was successful, or by reporting an error code. In either case, virtual server 421 completes the writing of monitored connection data to temporary file 701 at step 807, and at step 808 temporary file 701 is converted into data structure 702. Data structure 702 is then marked as being a member of archive 604 at step 809.

FIG. 9

Figure 9:
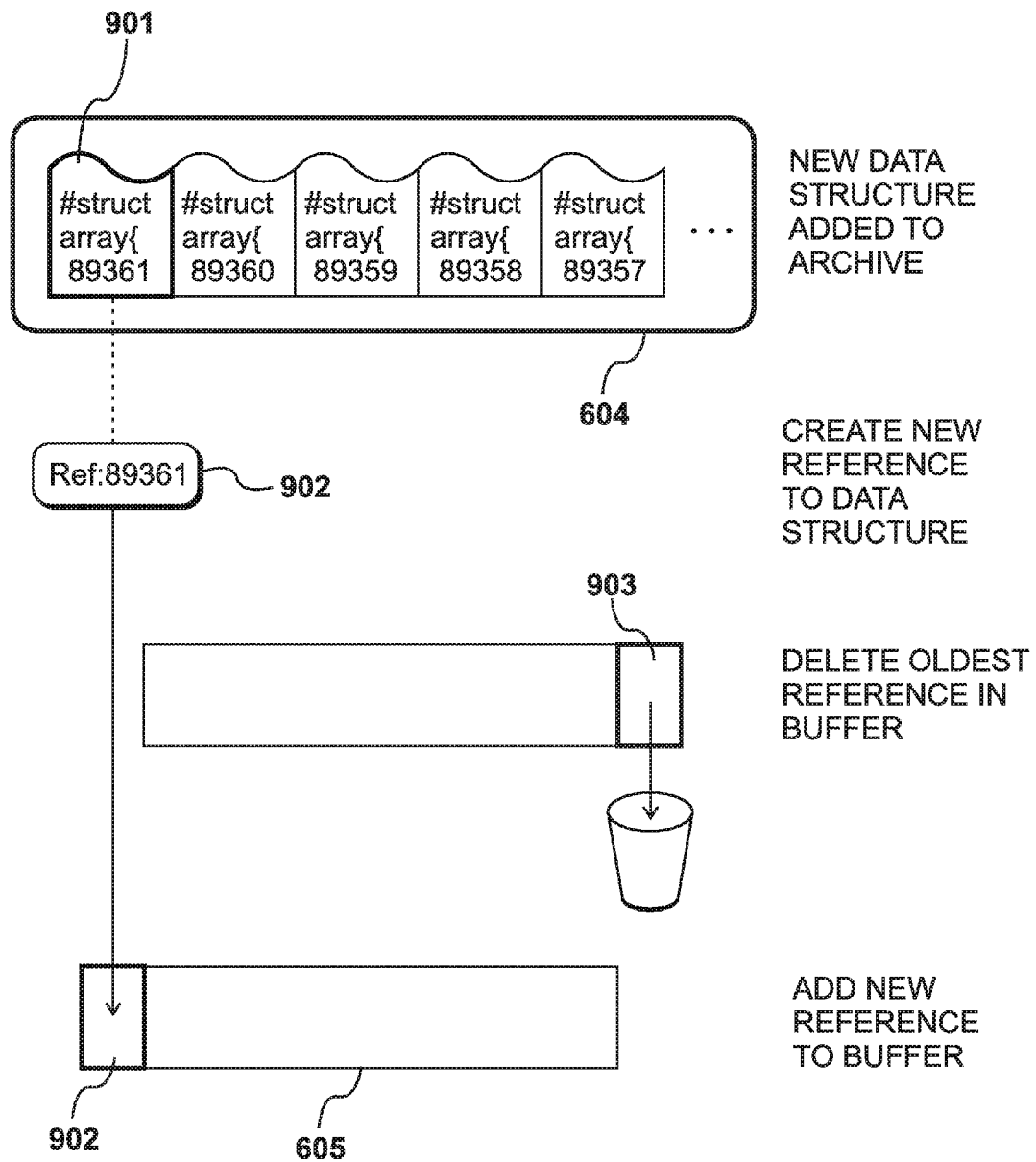
FIG. 9 illustrates the buffering of data structures for access by an external user interface process.

FIG. 9 illustrates the buffering of data structures for access by an external user interface process.

Buffer 605 is used to present a user of traffic manager 120 with a view of the most recently serviced connections using user interface process 607, and to allow access to the monitored connection data inside the data structures for inspection of various metrics.

When a data structure 901 is marked as belonging to archive 604, virtual server 425 running in buffer process 415 creates a reference 902 to it. Reference 902 only contains data indicating the location in memory of data structure 901, i.e. it is a pointer. Thus, reference 902 is much smaller in size than data structure 901, and does not require as many computation cycles to create or manipulate as creating a new copy in memory of data structure 901.

References that are currently in buffer 605 are marked as being members of buffer 605. Additionally, in order to stop referenced data structures being moved or removed from memory, when they are referenced they are marked as buffered. This ensures that any process that is pointed to a portion of memory by a reference will find the correct data structure.

As buffer 605 is of fixed width, it can only contain a finite number of elements. Therefore, before reference 902 is marked as being a member of buffer 605, an oldest reference 903 in buffer 605 is relinquished by being unmarked as being a member of buffer 605, and the data structure it was referring to is unmarked as buffered.

In the absence of this marking, garbage collection service 606 will alert kernel 402 and any memory management services to the fact that the portion of memory allocated to oldest reference 903 is no longer in use. When oldest reference 903 has been unmarked as being a member of buffer 605, virtual server 425 marks reference 902 as being a member of buffer 605. It then proceeds to also mark data structure 901 as buffered. Thus, buffer 605 will contain a reference to data structure 901, which represents the most recently made connection to a server by any child process.

Although buffer 605 is of a finite size, the size can be specified by a user. Thus, in some situations, a low request rate (say, 100 requests per second) is encountered and a buffer size of 10,000 connections would suffice. However, in other situations, the request rate is extremely high (say, 10,000 requests per second) and a much larger buffer is required in order to allow access to a reasonable length of time's worth of monitored connection data.

In an alternative embodiment, the retention of references in buffer 605 is dependent upon attributes of the request whose data structure they point to. Thus, in an example, criteria are established to the effect that only references to data structures for requests having an HTTP header size of greater than 8 kilobytes (which is the maximum allowed by many web server systems) are retained in buffer 605. Thus, in this example, it is only requests that are likely to cause errors that are buffered. In another example, the retention criteria could specify that the nth byte in the request is of a certain value. The selected byte could be one of particular interest; for example, it could monitor whether the SYN flag is set in a packet, and so only references are stored for completely new requests that have not been assigned a connection to a server.

This selection of retention criteria is particularly useful when the stability of a cluster is usually very good, and it is only requests having certain characteristics that cause issues. It could also be useful if the incoming request rate was particularly high, say in the region of 1,000,000 incoming requests per second. In an embodiment, in which the incoming request rate fluctuates a great deal, then there is a threshold, say 1,000 requests per second, under which the buffer stores references for all requests, but over which retention criteria are invoked in order to keep potentially problematic requests accessible for a reasonable period of time.

In a further embodiment, a number of named buffers are maintained, with the results of several retention criteria, such as those set out above, leading to references for different data structures being stored in different named buffers. Thus, in an example, there exists one generic buffer that stores references for each and every data structure created for a request or connection. An additional buffer is maintained as well, and stores references for data structures corresponding to requests or connections that meet certain criteria, i.e. they are of interest. Thus, the generic buffer has a high churn rate, but the additional buffer has a much lower churn rate as it is more likely that data structures containing interesting monitored connection data will need to be accessed for analysis over longer periods of time, say days are weeks rather than over the course of hours.

FIG. 10

Figure 10:
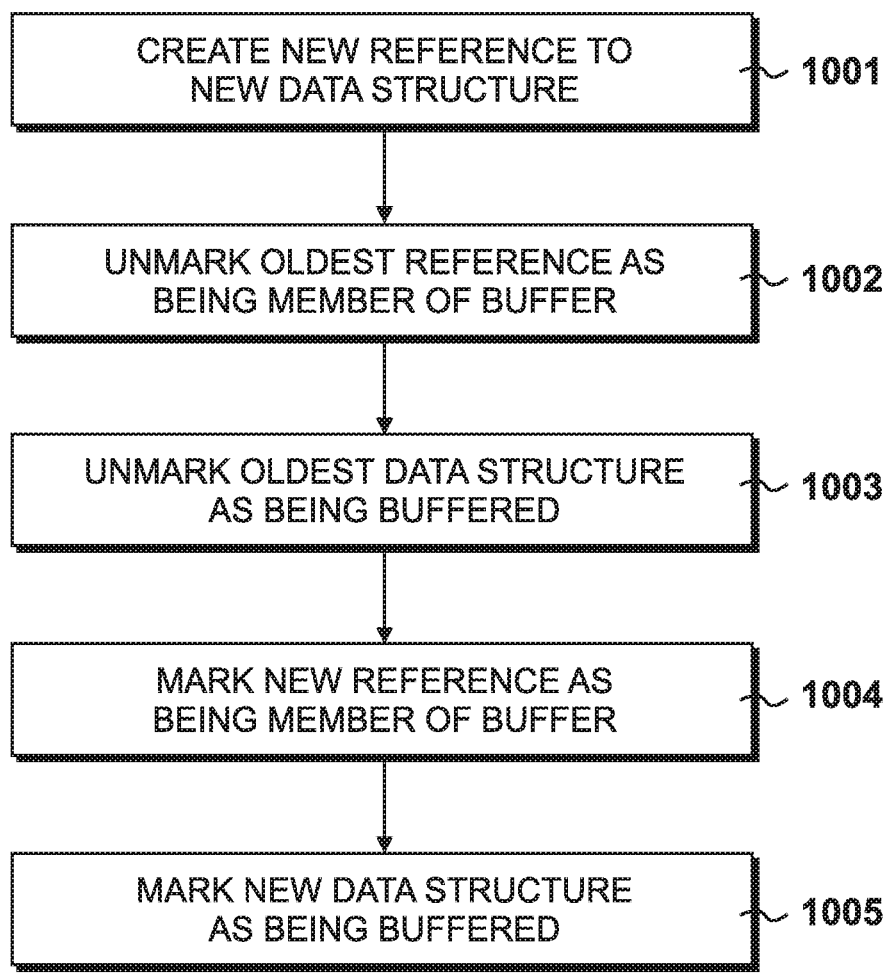
FIG. 10 shows steps carried out by buffer process 415 to add a new reference to buffer 605.

Steps carried out by buffer process 415 to add a new reference to buffer 605 are shown in FIG. 10.

At step 1001, reference 902 is created by virtual server 425 that refers to new data structure 901. At step 1002, oldest reference 903 in buffer 605 is unmarked as being a member of the buffer, and at step 1003 the data structure that it referred to is unmarked as buffered. Thus, garbage collection service 606 is able to reclaim the memory that was allocated to the oldest reference and the data structure.

At step 1004, reference 902 is marked as being a member of buffer 605, and at step 1005 data structure 901 is marked as buffered.

As new data structures are created after every request is serviced, the above steps will be repeated. Eventually, reference 902 will be unmarked as buffered along with the data structure it references, at which point garbage collection service 606 will allow other data to be written to the reference and data structure's respective memory positions.

FIG. 11

Figure 11:
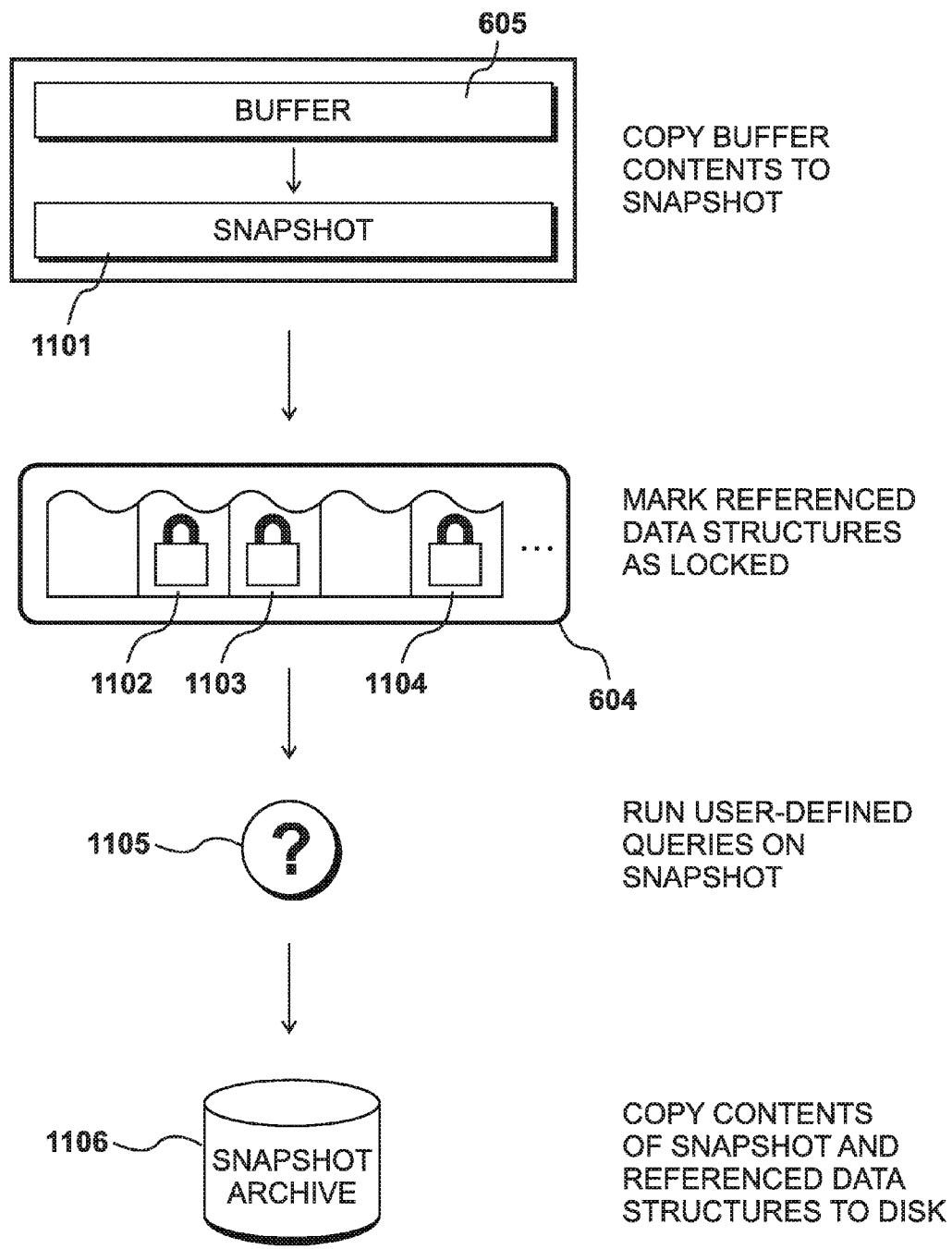
FIG. 11 illustrates the creation of a snapshot of buffer 605.

FIG. 11 illustrates the creation of a snapshot of buffer 605.

In many situations, failure of servers occurs when a large number of requests are made substantially simultaneously. In these instances, request rates may peak at around 100,000 requests for data per second. Due to the high rate of requests being processed by traffic manager 120, the churn rate on even a large size connection buffer will be high.

If in this case a server failed, and a user of traffic manager 120 wished to inspect the connection or connections which caused a failure, the state of the buffer at the time of inspection and the archived data structures available when they wish to inspect a connection will no longer correlate.

Thus, when a user inspect the buffer, a snapshot of the state of the buffer is created. The snapshot of the buffer is simply a copy of the references contained in the buffer at the moment the snapshot is created, and thus will continue to remain static irrespective of the removal and addition of references to the buffer.

If the buffer contained the data structures themselves, then copying the buffer within memory would utilise large amounts of computation time and resources.

However, as the buffer only contains references whose data is small in size, and not copies of the data structures comprising large volumes of data, it is a much less computationally intensive task to snapshot the buffer in this form.

As illustrated in the Figure, the contents of buffer 605 are copied to a snapshot 1101 located in a newly allocated portion of memory. Alternatively, buffer 605 is frozen and is relabelled as snapshot 1101, with an empty portion of memory then being allocated as buffer 605.

Once the process of establishing snapshot 1101 is complete, referenced data structures such as data structures 1102, 1103 and 1104 in archive 604 (the data structures referenced by snapshot 1101) are marked as locked. Thus, for as long as the snapshot exists, the data structures being referenced are not able to be moved, altered or deleted.

As part of the investigation by a user into the causes of a fault, queries 1105 are executed by spawning a query process in traffic manager 120 for searching referenced data structures referred to by snapshot 1101.

Queries 1105 comprise statements of attributes of monitored connection data that a user wishes to filter the data structures for. For example, such query strings may instruct a query process to filter data structures by a specific IP address, or filter for any HTTP error code beginning with a "5".

As all of the data structures comprise keyed data, and are therefore highly organised, searches for data matching query terms entered by a user via input device interface 208 are performed quickly.

In the event that snapshot 1101 needs to be retained for further analysis, the contents are copied to hard disk drive 203, along with referenced data structures such as data structures 1102, 1103 and 1104 for retrieval at a later time. This results in the creation of stored snapshots and stored data structures in a snapshot store 1106 on disk.

FIG. 12

Figure 12:
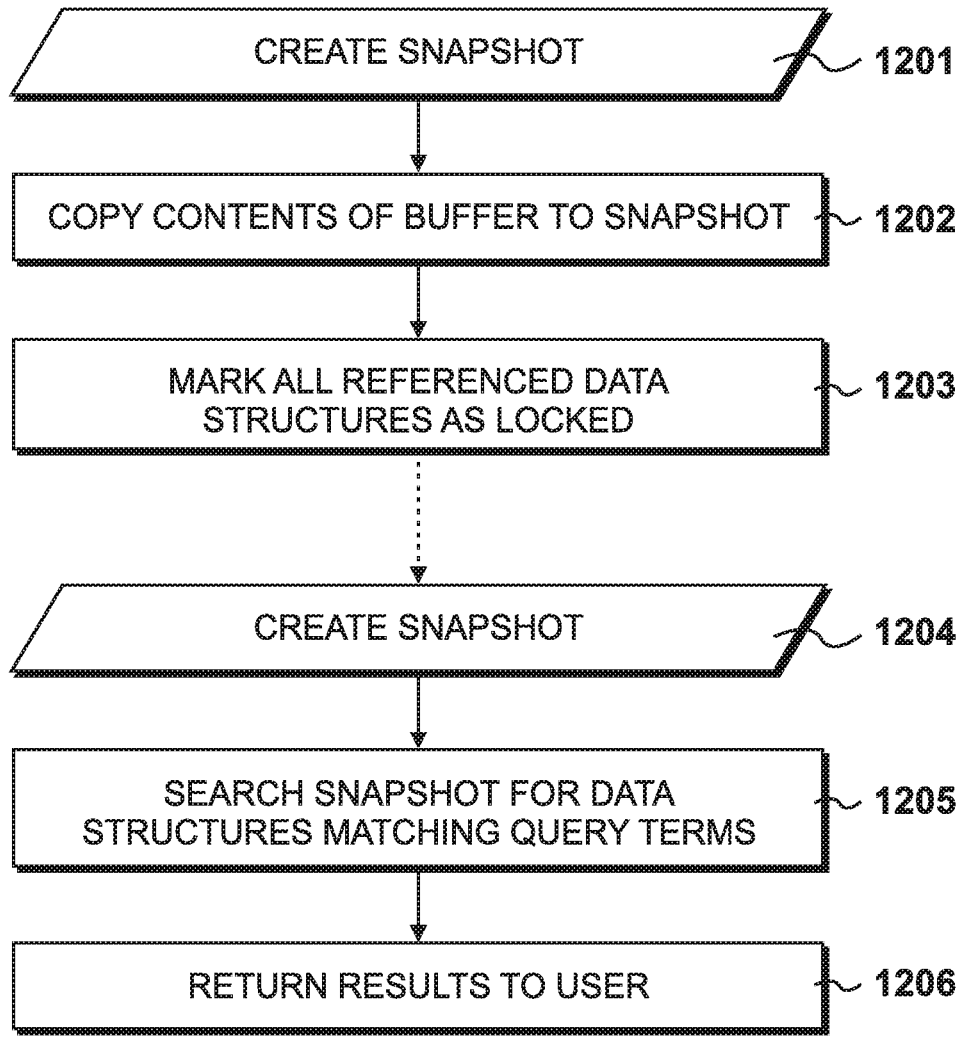
FIG. 12 shows steps carried out by buffer process 415 to create a snapshot.

Steps carried out by buffer process 415 to create a snapshot are shown in FIG. 12.

At step 1201, a user input is received that instructs traffic manager 120 to create a snapshot. At step 1202, the contents of the buffer are copied to a snapshot (or alternatively, the buffer is frozen and relabelled the snapshot, with the buffer being allocated an empty portion of memory). At step 1203, the referenced data structures referred to by the snapshot are marked as locked.

At step 1204, a user input is received that instructs traffic manager 120 to run a query on the snapshot. At step 1205, the referenced data structures referred to by the snapshot are searched for data that matches the user-defined query terms. At step 1206, the details of data structures matching the terms of the query are returned to the user.

FIG. 13

Typical debugging systems rely on the repeatability of scenarios that cause software to crash. For example, the Apache™ web server is compatible with the free software tool GDB, which allows the debugging of instructions that cause the web server software to fail. However, tools such as GDB rely on the instruction being able to be fed back in to the web server whilst the GDB tool is running and can monitor the web server's response. In environments where there is a high rate of requests and the requests are not archived, there is no scope for feeding back in to the server the problem-causing request, as it most likely contains a unique combination of attributes.

By snapshotting buffer 605 to produce snapshot 1101 as described with reference to FIG. 11, the apparatus of the present invention allows the recreation of the event that caused a server to encounter an error. The monitored connection data comprises enough details about the request (such as the virtual server that processed it, the server that serviced it, the route the connection took through the network and the details of the request itself) that a debugging process can be spawned within traffic manager 120 to recreate the request and the conditions that caused an error.

This allows a user interested in a particular problem-causing request to feed it back in to the server cluster and monitor any failures in real time. This may be achieved by specifying as part of the debugging process any break-points, used to stop the processing or servicing of the request to allow inspection of the current status of traffic manager 120 and, say, server 111.

Figure 13:
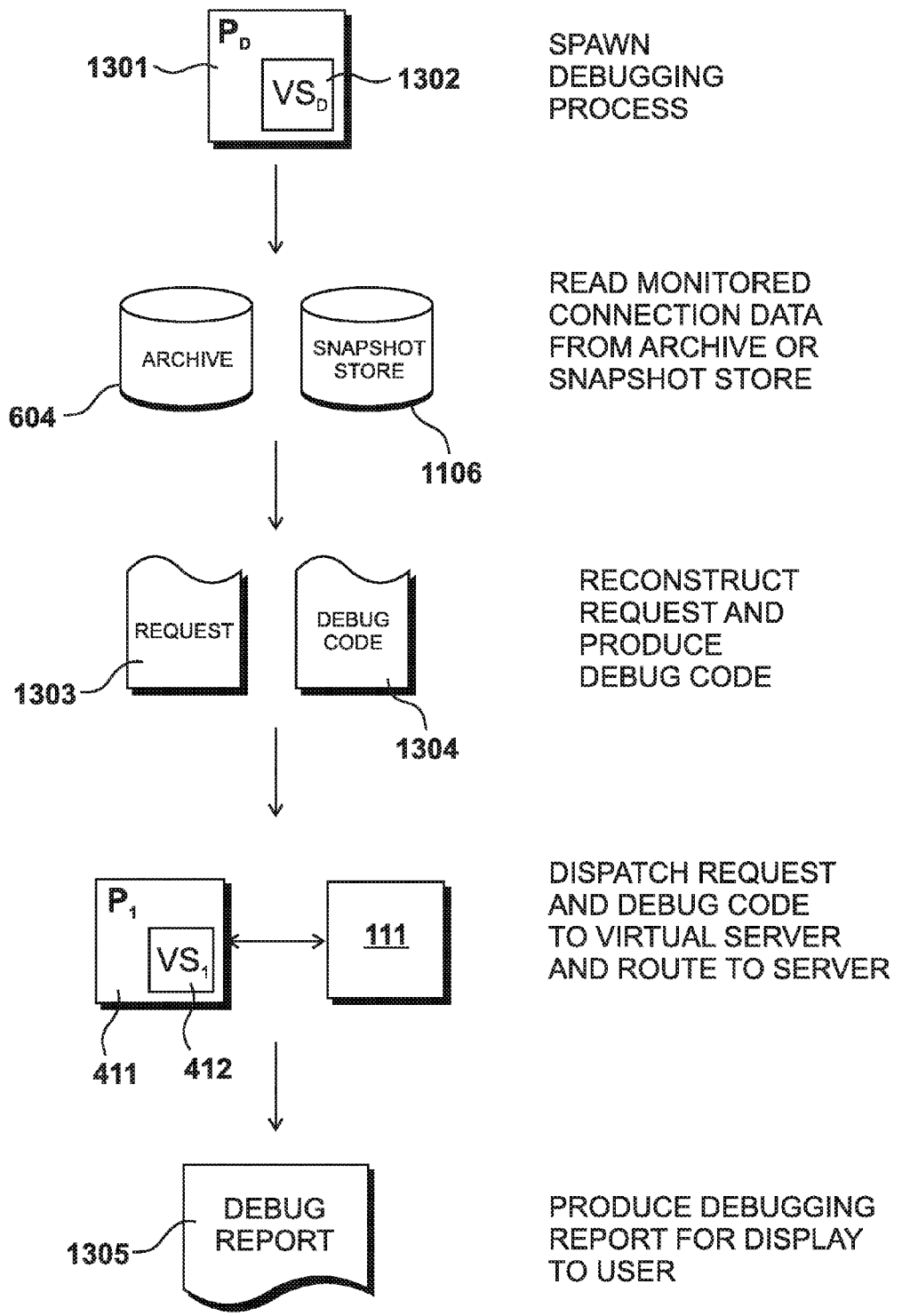
FIG. 13 illustrates the debugging of a connection referred to by a snapshot.

FIG. 13 illustrates the debugging of a problem-causing request. After receiving an instruction from a user to debug a particular historic connection, a debugging process 1301 is spawned within traffic manager 120, containing a virtual server 1302. Debugging process 1301 locates and loads the monitored connection data from either a data structure in memory or a stored data structure on disk. The location will depend upon whether the snapshot the data structure belongs to is recent and is still in memory or was saved to disk and is being accessed at a later date.

Debugging process 1301 proceeds to use the monitored connection data to reconstruct a request 1303. The monitored connection data also indicates which virtual server processed the original request, and also which server serviced the request. In this case, virtual server 421 in child process 411 and server 111 were used. This results in debug code 1304 being produced detailing the historic attributes of request 1303. Debug code 1304 also includes user-specified instructions regarding break points in the execution of the processing and servicing of request 1303.

Thus, debugging process 1301 dispatches request 1303 to child process 411, along with debug code 1304, where virtual server 421 processes and routes them to server 111.

A debug report 1305 is then produced at every specified break point, which allows the user to inspect the state of the connection at that moment, along with an opportunity to inspect the state of the entire system.

FIG. 14

Figure 14:
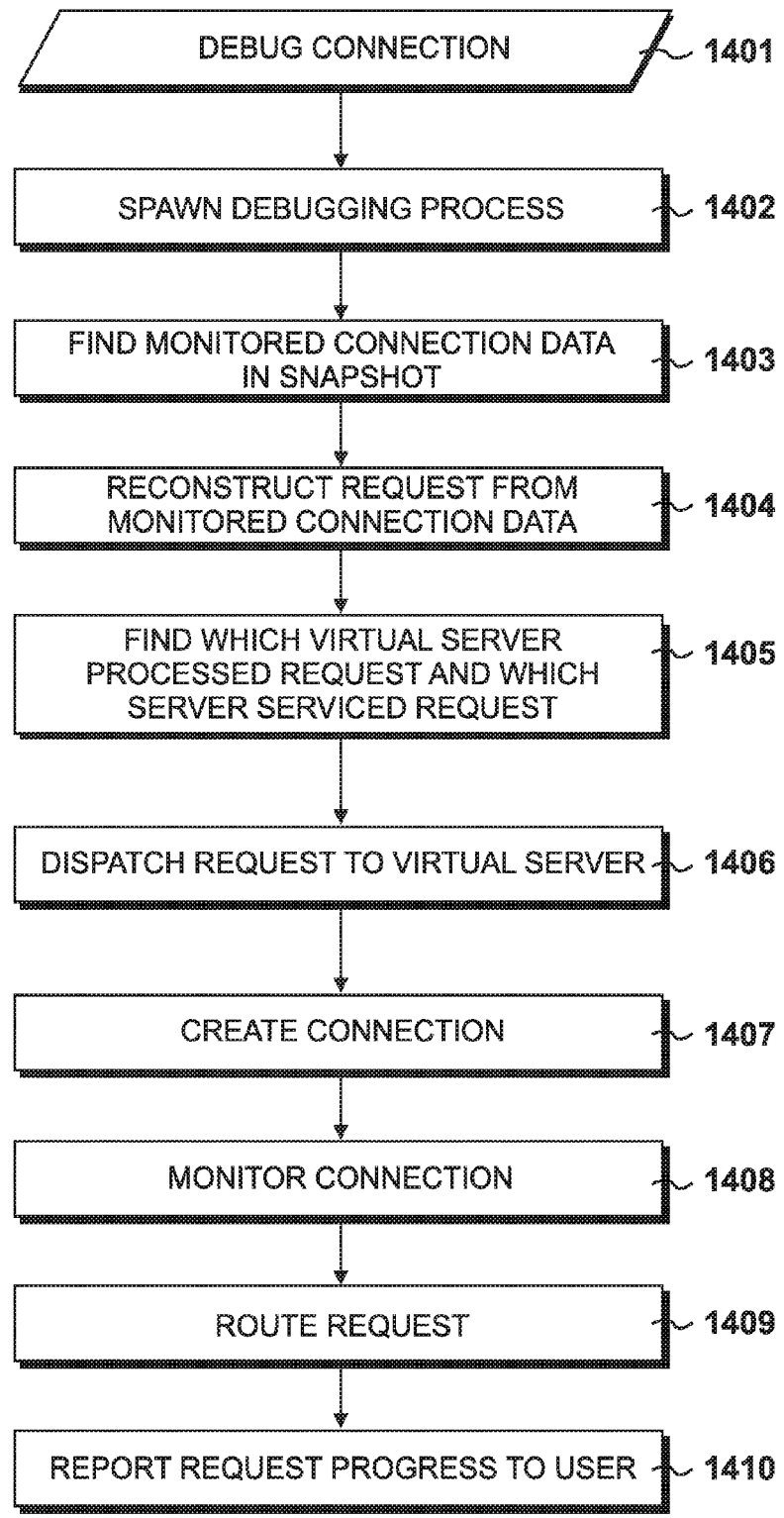
FIG. 14 details steps carried out to access and debug a connection referred to by a snapshot.

FIG. 14 details steps carried out by a debugging process to access and debug a connection referred to by a snapshot.

At step 1401, a user input is received that instructs traffic manager 120 to begin debugging a particular connection in a snapshot, and at step 1402 a debugging process is spawned within traffic manager 120. The debugging process includes a virtual server that operates in the same way as virtual servers 421 to 424. At step 1402, the snapshot is located in memory or on hard disk drive 203, depending on whether it is being inspected immediately or has been retained on disk for further analysis. The monitored connection data stored in the referenced data structures is located in the snapshot at step 1403, and at step 1404 the debugging process recreates the request from the monitored connection data.

At step 1405, the debugging process ascertains which virtual server processed the request, and which server serviced the request. At step 1406, the debugging process dispatches the request to the virtual process that processed the request with an instruction to route it to the server found during step 1405. At step 1407, the connection to the server is created, at step 1408 monitoring of the connection begins, and at step 1409 the request is routed.

At step 1410, the user interface process 607 reports to the user the results of the debugging of connections.

In an alternative embodiment, user input is received that results in the monitored connection data being modified prior to the debugging process recreating the request. Such modifications can include modifying or even removing certain fields in a request's HTTP header, changing data that was present in the connection stream, or even altering ancillary data such as the actual server that the connection was made to and which virtual server processed the request. Thus, when the debugging process acts upon the recreated request, the recreated connection can be made to specialised server infrastructure that is specifically installed for the purposes of debugging, and thus the debugging procedure does not interfere with primary infrastructure that is in the process of serving ongoing client requests.

What is claimed is:

1. An apparatus for processing requests from a plurality of connected clients for data stored by a plurality of connected servers, comprising a processor, memory, storage, and a network interface, wherein said processor is configured to:
receive requests from the connected clients via said network interface, select a connected server to route each of said requests to, thereby defining a selected server per request, create a connection per request to its selected server using said network interface, route each of said requests to their selected servers using said connections, monitor said connections whilst the selected servers service said requests, so as to create monitored connection data for each connection; and create and store in said memory a plurality of data structures, wherein each of said data structures contains monitored connection data relating to each connection;

create and store in said memory a buffer containing references to a finite number of said data structures, wherein each reference in the buffer points to a memory location in said memory where the said data structures are stored, and wherein upon creation of a data structure relating to the most recently created connection, reference to the oldest data structure in said buffer is removed.

2. An apparatus according to claim 1, further comprising a user input device, and wherein said processor is further configured to:

receive an instruction from said user input device to create a snapshot;

create in said memory a snapshot of said buffer at that moment; and mark the referenced data structures in said snapshot as locked, thereby creating locked data structures.

3. An apparatus according to claim 2, wherein said processor is further configured to copy said snapshot and said locked data structures to said storage, thereby creating an archived snapshot and archived data structures.

4. An apparatus according to claim 2, wherein said processor is further configured to:

receive an instruction to retrieve a stored data structure referred to by either said buffer or a snapshot;

extract the monitored connection data contained in said stored data structure; and recreate the request and the connection defined by said monitored connection data.

5. An apparatus according to claim 1, wherein said monitored connection data comprises error information relating to each connection that encountered an error.

6. An apparatus according to claim 5, wherein said processor is further configured to:

receive a query from a user via said input device, said query containing query terms;

query said referenced data structures for monitored connection data matching said query terms.

7. An apparatus according to claim 1, wherein said processor comprises a plurality of compute units for executing instructions, and runs a plurality of processes configured to process said requests substantially simultaneously.

8. An apparatus according to claim 7, wherein each of said plurality of processes comprises a virtual server for creating and monitoring said connections to said connected servers.

9. An apparatus according to claim 1, wherein said monitored connection data comprises data that was returned in response by a connected server to each request.

10. An apparatus according to claim 1, wherein said processor is further configured to make a decision as to which of said connected servers to create a connection to by performing a load balancing algorithm.

11. A method of processing requests from a plurality of connected clients for data stored by a plurality of connected servers, comprising the steps of:

receiving requests from connected clients;

creating a connection to one of the connected servers for each of said requests;

routing said requests to the connected servers using said connections;

monitoring said connections whilst the connected servers service said requests, so as to create monitored connection data for each monitored connection;

creating and storing a plurality of data structures, wherein each of said data structures contains monitored connection data relating to each monitored connection; and creating and storing a buffer containing references to a finite number of said data structures, wherein each reference in the buffer points to a memory location in said memory where the said data structures are stored, and wherein upon creation of a data structure relating to the most recently created connection, reference to the oldest data structure in said buffer is removed.

12. A method according to claim 11, further comprising the steps of:

receiving an instruction to create a snapshot;

creating a snapshot of said buffer at that moment; and marking the referenced data structures in said snapshot as locked, so as to create locked data structures.

13. A method according to claim 12, wherein said snapshot and said locked data structures are copied to a storage device, thereby creating an archived snapshot and archived data structures.

14. A method according to claim 11, wherein said monitored connection data comprises a length of time for which each connection was alive.

15. A method according to claim 14, further comprising the steps of:

receiving a query from a user, said query containing query terms;

querying said referenced data structures for monitored connection data matching said query terms.

16. A non-transitory computer-readable medium encoded with program instructions executable by a computer that, when executed by a computer, cause said computer to process requests from a plurality of connected clients for data stored by a plurality of connected servers, by performing steps of:

receiving requests from said connected clients;

creating a connection to one of said connected servers per request;

routing said requests to said connected servers using said connections;

monitoring said connections whilst said connected servers service said requests, so as to create monitored connection data for each monitored connection;

creating and storing a plurality of data structures, wherein each of said data structures contains monitored connection data relating to each monitored connection; and creating and storing a buffer containing references to a finite number of said data structures, wherein each reference in the buffer points to a memory location in said memory where the said data structures are stored, and wherein upon creation of a data structure relating to the most recently created connection, reference to the oldest data structure in said buffer is removed.

17. A non-transitory computer-readable medium according to claim 16, further encoded with program instructions that, when executed by a computer, cause said computer to perform additional steps of:

receiving an instruction to create a snapshot;

creating a snapshot of said buffer at that moment; and marking the referenced data structures in said snapshot as locked, so as to create locked data structures.

18. A non-transitory computer-readable medium according to claim 17, wherein said snapshot and said locked data structures are copied to a storage device, thereby creating an archived snapshot and archived data structures.

19. A non-transitory computer-readable medium according to claim 16, wherein said monitored connection data comprises a size of each of the said requests.

20. A non-transitory computer-readable medium according to claim 19, further encoded with program instructions that, when executed by a computer, cause said computer to perform additional steps of:

receiving a query from a user, said query containing query terms;

querying said referenced data structures for monitored connection data matching said query terms.

* * * * *